United States Patent [19]
von Holdt

[11] 4,210,620
[45] Jul. 1, 1980

[54] PIVOT ASSEMBLY MOLD METHOD

[76] Inventor: John W. von Holdt, 7430 N. Croname Rd., Niles, Ill. 60648

[21] Appl. No.: 911,001

[22] Filed: May 30, 1978

Related U.S. Application Data

[60] Division of Ser. No. 805,739, Jun. 13, 1977, which is a continuation-in-part of Ser. No. 739,198, Nov. 5, 1976, abandoned.

[51] Int. Cl.² ............................................. B29D 31/00
[52] U.S. Cl. .................... 264/163; 264/242; 264/318; 425/DIG. 59
[58] Field of Search .............. 264/242, 318, 163; 425/DIG. 58, DIG. 59

[56] References Cited

U.S. PATENT DOCUMENTS

| 3,456,913 | 7/1969 | Lutz | 264/242 X |
| 3,523,991 | 8/1970 | Tucker | 264/318 X |

FOREIGN PATENT DOCUMENTS

| 718339 | 9/1965 | Canada | 264/242 |
| 1236770 | 3/1967 | Fed. Rep. of Germany | 264/242 |

Primary Examiner—Thomas P. Pavelko
Attorney, Agent, or Firm—Charles F. Pigott, Jr.

[57] ABSTRACT

The following specification describes a paint can mold in which a pair of concentric ring members and cores at diametrically opposed positions create concentric mold cavities for forming projecting bushings on the pail, each having a concentric handle bearing. The plastic for forming each bearing and a handle interconnecting the bearings passes through a gate in each ring member. Withdrawal of the ring member severs the plastic in the gate from between the bushing and bearing so that the handle is free to rotate on the bushings. Means are provided to prevent disassembly of the handle from the can.

17 Claims, 23 Drawing Figures

PIVOT ASSEMBLY MOLD METHOD

CROSS REFERENCE TO RELATED APPLICATION

This application is a division of co-pending U.S. Application Ser. No. 805,739, filed June 13, 1977, which in turn is a continuation-in-part of copending U.S. application Ser. No. 739,198 filed Nov. 5, 1976 and now abandoned.

BACKGROUND OF THE INVENTION

FIELD OF THE INVENTION

This invention relates in general to a pivot assembly mold, and more particularly to a mold enabling an improved and more economical method for forming and attaching a freely rotatable handle to an article and/or the more economical article created thereby.

SUMMARY OF THE PRIOR ART

Pivot assemblies for pails, as for example, used in the paint industry and the like usually include a wire handle or bail having bent ends for receipt in the recesses of a pair of metal ears attached to the wall of a metal pail.

This arrangement suffers from the need to attach the ears to the annular metal wall of the pail, and then to assemble the wire bail to the ears. There are economic defects in this arrangement, since the expense of attaching the ears and assembling the bail represents a significant portion of the pail cost.

In the case of inexpensive, light duty plastic pails, ears are formed simultaneously with the molding of the pail, but the handle or bail must still be formed and attached in separate steps or operations, since no economically viable technique has heretofore been developed for enabling a mold part forming the bearing surfaces between the pail and handle to be withdrawn, while retaining the bail attached or assembled to the pail.

Attempts have been made to sidestep the problem of forming the bearing surfaces in the case of relatively expensive, heavy duty plastic pails for use in the paint industry by simultaneously molding a plastic pail and bail in integrally formed and attached relationship. The bail is pivotable only through a limited angle, since the integral connection restrains the relative movement. As may be appreciated, this creates inconvenience in use, while the weight of the pail and its contents places severe stress on the integral connection. The result is that while some economies are offered in the fabrication of the pail, this type of integrally molded pail and bail does not provide practical, convenient carrying and stacking properties, and accordingly has not received universal acceptance.

SUMMARY OF THE INVENTION

The present invention proposes a substantial improvement in the method of forming a pivot assembly, for a pail, a box with a hinged lid, or other structures, by integrally molding bearing surfaces between a plastic bail and plastic bushings formed on the pail, for example, and severing the integral connection therebetween, to permit free rotation of the bail relative the pail, while thereafter maintaining the pail and bail in assembled relationship.

This is done by providing a mold in which diametrically opposed pairs of concentric mold chambers or cavities are defined by pivot assembly making apparatus in a mold. A ring member is positionable in the mold chamber to define a pair of spaced mold cavities inside and outside of the ring member, and means for inserting and withdrawing the ring member from the mold chamber is provided.

The mold is adapted to receive materials to be molded into the mold chamber. Also, means are provided for causing the separate members molded in the spaced mold cavities to be interlocking, relatively pivotable relationship, to prevent them from separating from each other. Various specific embodiments of this means are described below.

The mold cavity between the inner surface of each ring member and core may be in communication with the mold cavity forming the annular wall of the pail or other article, to form a bushing therebetween projecting from the pail wall. A gate in each ring member communicates the plastic to a mold cavity positioned between the outer surface of each ring member and a bore of the mold, to form an outer bearing positioned about each bushing. Plastic in each bail or handle bearing cavity can extend into an arcuate mold cavity interconnecting the outer bearing cavities for forming the handle or bail, or, alternatively a box lid or the like.

As one type of interlocking means, an end shoulder and internal recess in the ring member can define arcuate resilient retaining ear portions at the end of each molded bushing. After the core is withdrawn from the bushing, the retaining ears are free to flex inwardly to enable withdrawl of the ring member. Withdrawal of the ring member severs the plastic in the gate from between each bail bearing and bushing, so that the handle is free to rotate, while the resilient retaining ears limit relative axial movement between the bearings and bushings to prevent disassembly of the bail from the pail.

The problem of withdrawing the ring mold part forming the spaced bearing and bushing surfaces is solved by the simple provision of providing a core or plunger in the ring member adjacent resilient ear portions thereon, to facilitate withdrawal of the ring mold part from between the bearing surfaces by deflection of the resilient ear portions after the plunger has withdrawn. The resilient ear portions then assume their normal position to prevent disassembly of the bail from the pail.

As another type of interlocking means, the core or plunger member which is positioned within the ring member may define a flared or pointed end. Accordingly, prior to the molded plastic reaching complete solidification, the bushing or pivotal member molded within the ring member is spread outwardly into interlocking relation with the relatively pivotable member molded outside of the ring member by means of the plunger member passing through the bushing, as specifically illustrated below.

It is therefore one object of the present invention to provide an improved mold and/or method for forming a pivot assembly.

It is another object of the present invention to provide an improved mold and/or more economical method for forming a freely rotatable bail on a pail.

It is still another object of the present invention to provide a more economical assembly of a plastic pail and a freely rotatable plastic bail.

Other objects and features of the present invention will become apparent on examination of the following specification and claims together with the drawings.

DESCRIPTION OF THE PREFERRED EMBODIMENT

Figure 1:
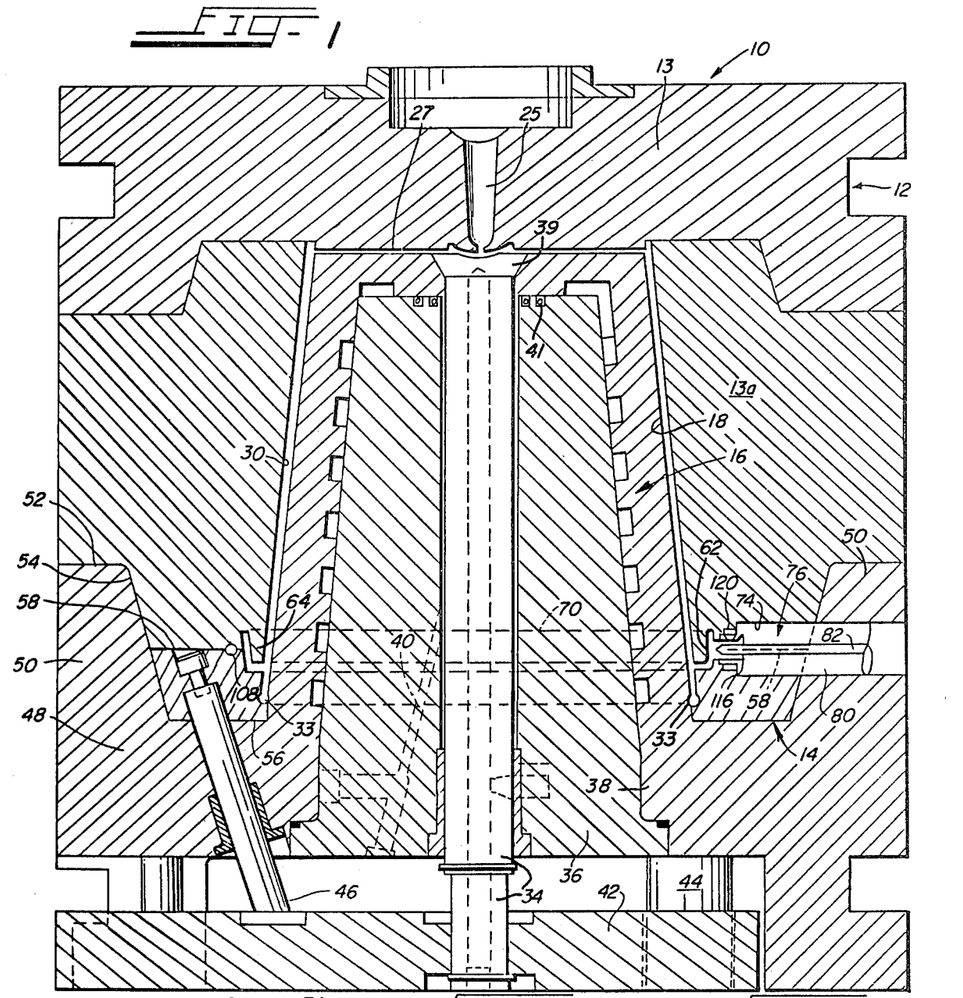
FIG. 1 is a sectional view taken along transverse diametrical planes illustrating the relevant portions of a mold assembly incorporating the principles of the present invention.

Referring to FIGS. 1 through 10, in FIG. 1 of the relevant portion of a mold assembly incorporating the principles of the present invention is indicated by the reference character 10. The mold assembly 10 is shown in half sections taken along transverse diameter lines or planes to illustrate various relationships between the parts, and includes an upper, cup-shaped outer mold assembly 12 having a separable back wall 13 and annular wall 13a arranged for conventional vertical and radial outward movement. A lower mold ring assembly 14 is provided at the open end of assembly 12. It will be understood that references to various directions of movement or location are made with respect to the drawings and are not limitations on the orientation of the parts or their movement.

An inner core assembly 16 is received by the cup and ring mold assemblies 12 and 14 to define a cup-shaped mold cavity 18.

Figure 7:
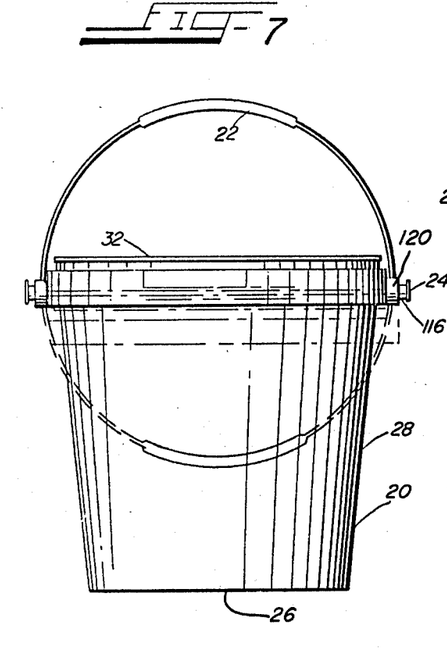
FIG. 7 is a side elevational view of a pail molded in accordance with the principles of the present invention and indicating a stack of such pails by broken or dashed lines.
Figure 8:
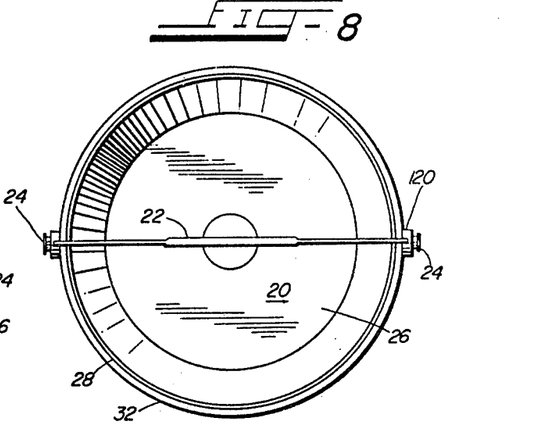
FIG. 8 is a top elevational view of the pail shown in FIG. 7.
Figure 9:
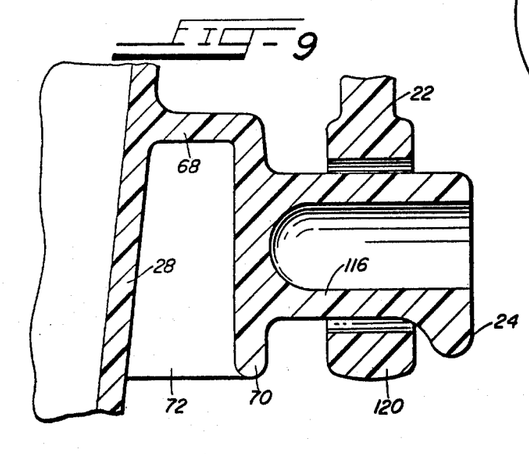
FIG. 9 is an enlarged fragmentary view of the pail bushing and bearing formed in accordance with the principles of the present invention.
Figure 10:
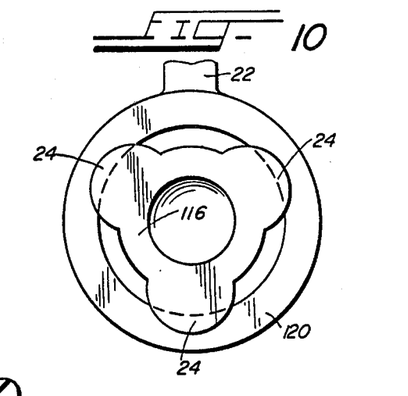
FIG. 10 is an enlarged fragmentary end view of the pail bushing and bearing shown in FIG. 9.
Figure 11:
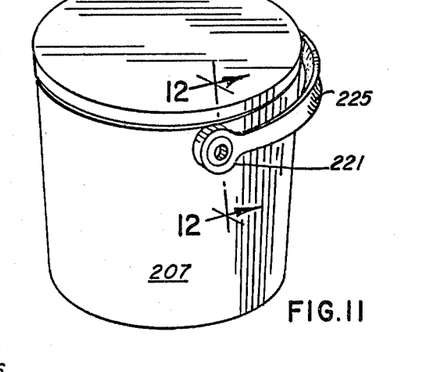
FIG. 11 is a perspective view of a bucket made in the mold illustrated in FIGS. 13 through 16.
Figure 12:
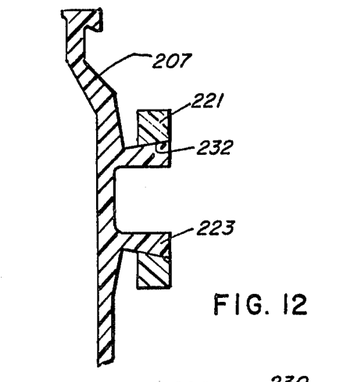
FIG. 12 is a sectional view taken along line 12—12 of FIG. 11.

A bucket, can or pail 20 made by this mold has a freely rotatable handle or bail 22 attached to pail 20 by spaced retaining ears 24, as best seen in FIGS. 7 and 8. The bucket is formed in cavity 18 during a single molding cycle or operation by the injection of a suitable plastic molding powder or mixture through a passage 25 formed in the back wall of the upper mold means or assembly 12. Passages for the conventional transmission of a cooling fluid may also be provided in the respective assembles.

The pail 20 includes a back wall 26 formed in corresponding mold chamber 27 at the end of passage 25 between assemblies 12 and 16, and an annular side wall 28 formed in cavity 30, which is defined by the spacing between the outer surface of core assemblies 12 and 14 with the cavity 30 extending radially outwardly at a draft angle of about 5° from the perpendicular to the back wall cavity 27. Cavity 30 terminates in conventional radially inwardly and outwardly directed recesses 33 located respectively in the core means 16 and ring assembly 14 to form a conventional circumferential lip or bead 32 at the open end of pail wall 28. Lip 32 enables a conventional lid (not shown) to be held in engagement with the open end of wall 28 to close the can or pail 20.

The core means 16 includes a knockout pin 34 extending in a passage along the axis of an inner member or inner core 36. Member 36 seats in the cavity of a cup shaped outer core or core member 38, which in combination with assemblies 12 and 14 defines the mold cavity 18. The knockout pin 34 extends through a passage in the back wall of member 38 and has a flared end portion 29, the end face of which is spaced opposite passage 25 to define a central portion of the back wall of cavity 18 and the back wall of pail 20. The flared end portion of pin 34 is seated in a flared seat of the passage in the back wall of core member 38 for preventing the application of air pressure to the pail back wall from an ejection air passage 40 in the inner core 36, and this prevents ejection of the pail until the knockout pin 34 is moved relative the core members 36 and 38 by an ejector plate 42 located below the core member 36. O rings 41 encircling the pin 34 prevent air from passage 40 in the passage surrounding the pin 34 from entering the space between the back wall of core member 38 and core member 36.

The ejector plate 42 is arranged for guided conventional movement along the axis of pin 34 on pins or bushings such as 44 to engage a shoulder on pin 34 at a predetermined position to move the pin 34. Pins such as 46 resting on wear pads of the plate 42 are also moved by the plate 42.

The pins 46 extend vertically upwardly and radially outwardly from the ejector plate 42 to pass through a radially outwardly directed annular flange 48 on the outer core member 38 to move the ring assembly or ring 14. Ring 14 is arranged as a split ring for movement of the respective segments radially outwardly and vertically upwardly, as seen in the drawings.

The flange 48 defines outer wall 50, which in turn defines an annular horizontal parting line between the assemblies 12 and 16 at surfaces 52, space radially outwardly of ring 14. The parting surfaces 52 between assemblies 12 and 16 extend to radially inwardly directed, vertically extending annular surface 54, also to the radially inward side 54 of annular wall 50. Side 54 forms an annular, inclined parting line with ring means 14 below assembly 12. Also, horizontal, annular parting line is formed at surfaces 56 between the outwardly extending flange 48 and the lower surface of ring 14 permitting radially outward and upward movement of the ring 14 in response to the movement of the ejector plate 42 and pins 46 in an upward direction.

Figure 2:
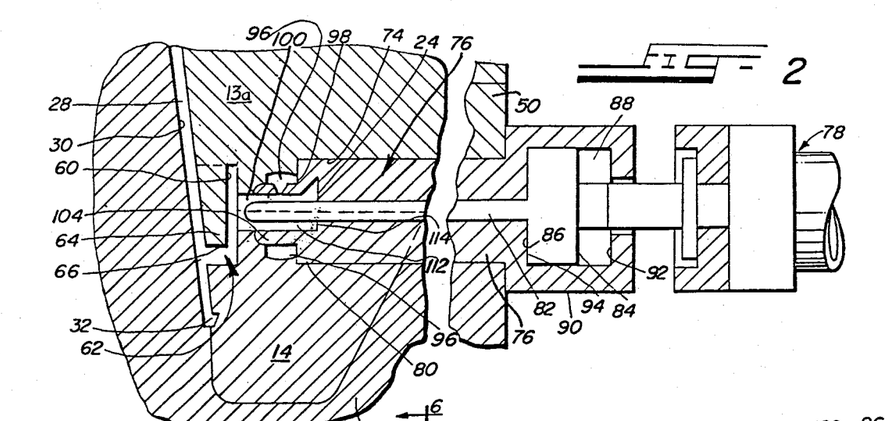
FIG. 2 is an enlarged fragmentary view of the insert assembly used in the mold assembly seen in FIG. 1 for molding the bushings and bearings.
Figure 3:
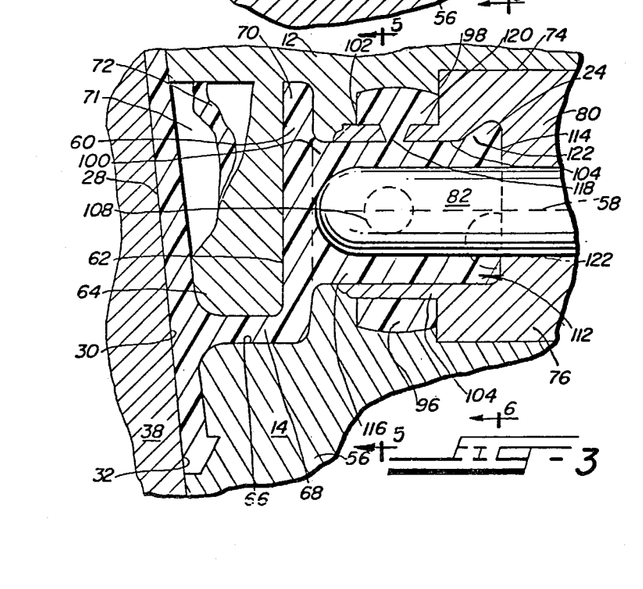
FIG. 3 is an enlarged fragmentary view of a portion of the insert assembly seen in FIG. 2 in position for molding the bushings and bearings.
Figure 4:
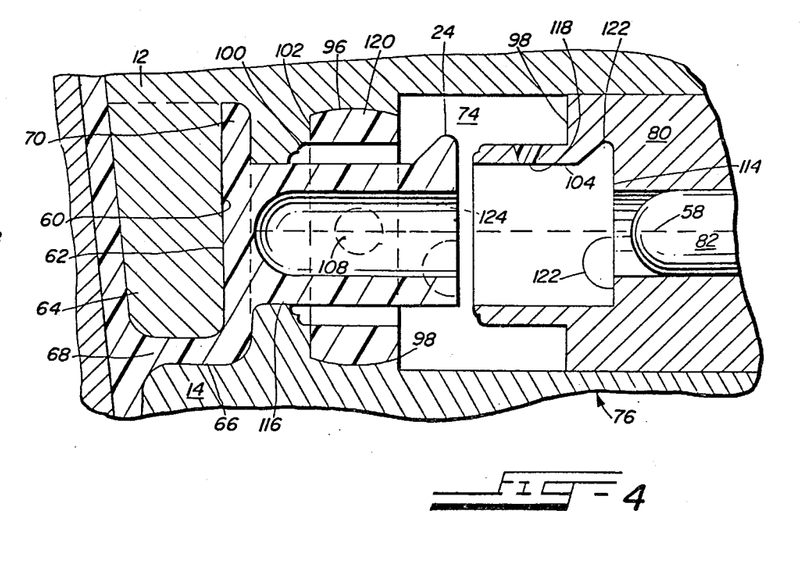
FIG. 4 is an enlarged fragmentary view similar to FIG. 3 and showing the relevant portion of the insert assembly being withdrawn from the bushing and bearing.
Figures 5, 6:
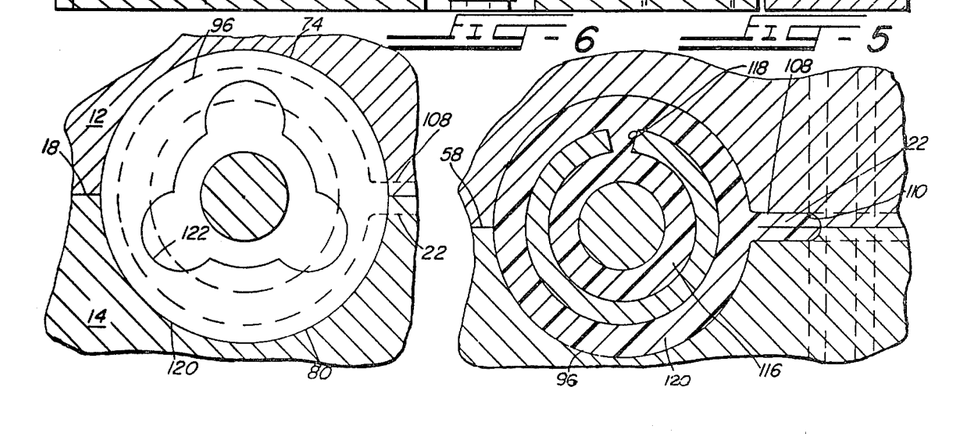
FIG. 5 is a sectional view taken generally along the line 5—5 in FIG. 3.
FIG. 6 is a sectional view taken generally along the line 6—6 in FIG. 3.

A horizontal annular parting line is formed between assemblies 12 and 14 at surfaces 58 which extend radially inwardly from wall 50 along a horizontal plane to a position intermediate opposite ends of one annular vertical or axial leg 60 of a cross-sectionally L shaped annular mold cavity 62 as best seen in FIGS. 2–4. Cavity leg 60 is formed by a recess extending upwardly from parting line 58 in assembly 13a and a pair of spaced vertical surfaces formed respectively by a depending leg 64 and a recess of assemblies 12 and 14 extending below surfaces or parting lines 58. The other cavity leg 66 of cavity 62 is formed by a pair of spaced horizontal surfaces located respectively at the end of the depending leg 64 of assembly 12 and the mating recess of ring 14.

The leg 66 communicates at its radially inward end with the annular mold cavity 30 adjacent to but spaced from the lip 32, so that the molten plastic material flows from cavity 30 into cavity 62. A peripheral annular wall 68 of bucket 20 (FIG. 9) is thus formed in cavity leg 66 extending radially outwardly from the annular wall 28 of the pail 20, and a skirt wall 70 depending from wall 68 is formed in cavity leg 60.

In addition each leg 64 of assembly 12 is provided with a series of spaced recesses 71, as best seen in FIG. 3, extending radially between cavities 30 and 62 for forming a plurality of spaced reinforcing ribs 72 between the annular wall 28 and the skirt wall 70 of the pail 20.

Also extending radially outwardly from intermediate the ends of cavity leg 60 so as to be symmetrical with the parting surfaces 58 are a pair of diametrically opposed cylindrical cavities or passages such as 74. Passages 74 each receive an insert assembly 76 extending through flange 50 and movable radially relative the pail axis by a conventional hydraulic cylinder assembly 78 at a selected or predetermined time in the molding cycle.

Each insert assembly 76 as best seen in FIGS. 2 and 3 includes an elongate outer sleeve member 80, whose axis extends along surfaces or parting line 58. Sleeve member 80 is movably carried by an elongated core member 82. The core member 82 also passes through flange 50, and is alternatingly moved along its longitudinal axis in opposite directions by the hydraulic assembly 78.

Member 82 is provided with spaced shoulders 84 and 86 seated in a recess 88 of an enlarged portion 90 of sleeve member 80 external to wall 50. Shoulders 84 and 86 are adapted to engage shoulders 92 and 94 respectively at opposite ends of the recess 88 in response to movement by the cylinder 78 of the core member 82.

Passages 74 each include a bore portion 96 spaced from cavity leg 60 and extending axially from the respective passage 74. One end of bore 96 is closed by an enlarged shoulder 98 on sleeve member 80. A reduced diameter bore 100, coaxial with bore 96, is formed between bore 96 and cavity leg 60 with a shoulder 102 located intermediate bores 100 and 96.

A ring member 104 projects from shoulder 98 of sleeve member 80 with the ring being of reduced diameter for extension through bore 96 into bore 100, to form an annular mold bearing cavity outside of ring member 104 within bore 96, with end surfaces formed by shoulders 10s and 98. As best seen in FIGS. 3–6, each cavity 96 communicates with an end mold passage 108 for handle 22 in assemblies 12 and 14, extending between spaced, diametrically opposed mold cavities 96, to define the handle or bail mold cavity.

The ring member 104 projects against a reduced diameter shoulder in bore 100. Elongated core or rod 82 extends therethrough and terminates adjacent cavity leg 60. The periphery of core 82 is spaced inwardly from the inner surface of the ring member 104 to define a second annular mold or bushing cavity 112, concentric with cavity 96 and terminating at an inner shoulder 114 formed in sleeve 80 at a position spaced outwardly of shoulder 98 and mold cavity 96.

Cavity 112 communicates at one end with the cavity leg 60 for receiving molten plastic material to form an annular boss or bushing 116 on skirt wall 70 of the bucket, terminating at shoulder 114. Cavity 112 also communicates with annular mold cavity 96 through a gate or passage 118 in ring member 104, for forming an annular bearing member 120 on the bucket intermediate the ends of the bushing 116 and the handle 22 in handle cavity 110 by allowing plastic to flow from cavity 112 to cavity 96. Retaining ears or resilient retaining fingers 24, for retaining the bearings 120 and handle 22, are formed on the end of bushing 116 in a series of three equally spaced recesses 122 formed in the inner surface of sleeve 80 at the outward end of cavity 112 at shoulder 114.

For operation, the mold assembly 10 is mounted in a conventional molding machine and moved to the closed position indicated in FIG. 1 by such conventional means as hydraulic pressure.

A molten plastic material is injected through the passage 25 in the back wall of the assembly 12. The plastic flows through the cavities 18, 30, and 62 and into the cavities 112 and 96 defined by the core 82 and ring 104, to form the projecting bushings 116 and retaining fingers 24 respectively of the bucket.

Plastic flows from cavity 112 through the gate 118, in the ring 104 into the bore cavity 96, defined outside of ring 104, to form the handle bearings 120. From cavity 96 the plastic also flows through the arcuate bail cavity 108 between the ring means 14 and the assembly 12 to form the bail 22 interconnecting the bearings 120.

The molten plastic also flows into the recesses between ring means 14 and the core member 38 at the lower end of cavity 30 and through the recesses 71 in the leg 64 (FIG. 3) of assembly 12 to form lip 32 and ribs 72 respectively. It will be understood of course that the plastic for forming the bail and ring bearing may be supplied through another or additional paths. However, the advantages in providing the common communication with cavity 30 for forming the various portion of a pail are substantial.

After cure has taken place, and while the plastic is still warm, the hydraulic cylinders 78 (FIG. 2) are activated to move each core member 82 radially outwardly from the pail. The core member 82 is moved past recesses 122 to clear ears 24 and shoulder 114. Shoulder 84 on core 82 engages shoulder 92 of the recess 88 in sleeve member 80, to cause the sleeve member 80 to be also moved radially outwardly from the pail. The ring member 104 therefore moves radially outwardly also.

Movement of the ring member 104 shears the plastic in gate 118 from the bushing 116 and from the ring bearing 96, while simultaneously causing the retaining ear 24 to flex radially inwardly toward the core axis as indicated by dashed line 124 in FIG. 4. Flexing movement of FIG. 24 occurs without interference, since the core 82 has already been withdrawn. As soon as the ring member 104 passes the retaining ears 24, they return to their normal position, which is radially coincident with the bearings 120, for preventing disassembly of the ring bearings 120 and bail or handle 22 from the pail 20.

The upper mold assembly 12 is then moved upwardly to clear leg 64 from between the annular wall 28 and skirt wall 70 of the pail, whereafter segments of mold assembly 12 are moved radially outwardly to clear the pail.

The ejector plate 42 is now permitted to move upwardly. As it does so pins 46 move the split ring means 14 outwardly and upwardly. The pins 46 may of course translate or move transversely of the plate 42 on the wear pads. The recess in core 38 for forming lip 32 of the bucket is shallow, and at a small transverse angle to wall 28 to permit lip 32 to flex free of the core as the radially inward pressure of ring 14 is relieved, while the pail 20 is carried upwardly by the engagement of ring 14 with wall 68 of the bucket (FIG. 4).

As the ejector plate 42 continues to move upwardly, it engages the shoulder on the knockout pin 34, to move the knockout pin 34 upwardly for disengaging the flared portion 39 of the pin from the flared seat in the back wall of the core 38, thereby permitting air from the passage 40 to blow the pail free of the mold assembly 10.

Closure of the mold assembly may now take place with the ejector plate 42 moving downwardly, to enable ring assembly 14 to engage the cup shaped flange 48 along parting surfaces 54 and 56, while the upper mold assembly 12 is returned to the closed position shown in FIG. 1 to engage wall 50 along surfaces 52. The hydraulic cylinder 78 now moves core member 82 radially inwardly to disengage shoulders 84 and 92. Shoulder 86 on the core member 82 thereafter engages shoulder 94 on the sleeve member 80, to also move the sleeve member radially inwardly. When shoulder 98 on the sleeve member closes one end of bore 96, the mold 10 is prepared for another molding cycle.

Essentially, therefore, the ring 104 forms a pair of spaced bearing mold cavities with the ring outer surface forming one bearing cavity surface and the ring inner surface forming the other bearing cavity surface. Since the cavity 112 defined by ring 104 extends past the outer bearing cavity 96, the ears or resilient retaining means 24 formed therein occupy a radial position intercepting the outer handle bearing 120 in the formed porduct. The ears 24 are secured to the inner bearing 116, and their radially inward flexure is permitted by the retraction of core 82, which also defines the inner wall for the cavity 112.

As the ring 104 withdrawn axially, it engages the newly-formed ears 24, to flex the ears radially inwardly. When ring 104 disengages from the ears, they simply flex or return to their normal radial position, intercepting again the outer bearing 120, to limit axial movement of the outer bearing relative the inner bushing 116.

Typical or practical dimensions for the bushing 116 is an inner diameter of 0.18 inch and an outer diameter of 0.3 inch. The outer bearing 120 may have an inner diameter of 0.39 inch and an outer diameter of 0.56 inch with the ears 24 formed on an outer radius of 0.23 inch, so that a relatively large intercepting area is provided.

With the pail and bail separated from the mold, it may now be utilized for the desired purpose without further assembly or fabrication of either the pail or bail, or assembly of either the bail 22 or retention means 24 to the pail, since the bail 22 is now freely rotatable on and attached to the pail. Thus the rings 120 and bail 22 may rotate about the axis of each bushing 116 from a position in which the bail is engaged with the pail wall 28, as shown by the dashed lines in FIG. 7, to a vertical position in which the bail is aligned with the vertical axis of the pail for carrying purposes. Rotation of the bail to engage wall 28 permits easy stacking of the pails, as shown by the dashed lines in FIG. 7, with the skirt wall 70 and ribs 71 of each pail resting on the open end of the annular wall 28 of the lower pail. Retraction or disassembly of the bail from the pail is of course prevented by the transverse, flexible retaining ears or fingers 24 on the bushing or each boss 116, which hold or limit relative axial movement of the bail rings or bearings 120.

Referring now to FIGS. 11 through 17, a bucket, and another embodiment of a bucket handle molding apparatus in various stages of operation, is illustrated. Overall, the structure and function of the mold of this embodiment is generally similar to the previous embodiment, except as otherwise described herein.

Figure 13:
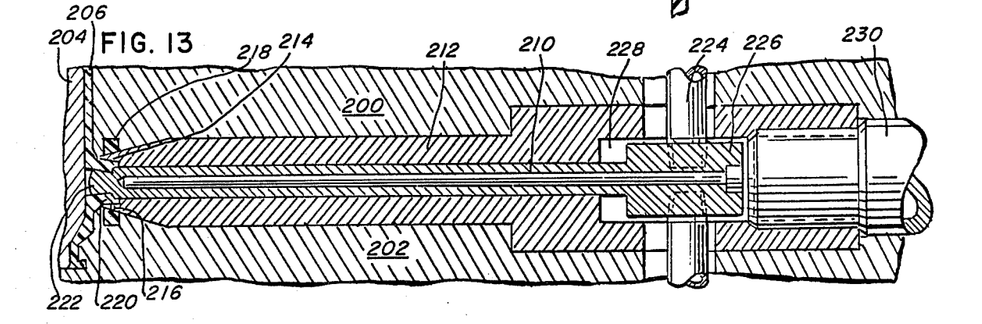
FIG. 13 is a longitudinal sectional view of part of a mold for a bucket or the like, utilizing a different embodiment of structure for forming an attached, freely pivotable handle on the bucket, shown in an initial stage of operation.

Referring to FIG. 13, mold parts 200, 202, 204 are separably positioned together to define a bucket-forming cavity 206, in which plastic is shown to be molded to form a bucket 207.

A plunger 210 is provided, being positioned within an insert member 212 as shown, which terminates in a ring member 214, defining a gate 216, as in the previous embodiment to, in turn, define, during the molding operation, spaced outer chamber 218 and inner chamber 220. These chambers are analogous to the previously described outer chamber 96 and inner chamber 112 as shown, for example, in FIG. 2. A passageway through the mold is positioned in communication with the two diametrically opposed outer chambers 218 on the bucket to serve as a handle mold cavity, being fed with plastic, if desired, through gate 216, or, alternatively, having independent feeding means. The handle mold cavity is not shown in FIGS. 13 through 16, but is positioned in a manner similar to the handle mold cavity 108 of the previous embodiment.

In distinction from the previous embodiment, plunger 210 defines a bulbous end 222 fitting within the inner mold chamber 220. As a further distinction from the previous embodiment, no enlarged portion of inner chamber 220 is defined for forming any structure analogous to ears 24 of the previous embodiment.

Plunger 210 having bulbous front end 222 and rear end 226, may be freely slidable within insert member 212, to be adapted to reciprocate back and forth in chamber 228 of insert member 212. Conventional hydraulic means 230 are connected with insert member 212 for the independent control of that structure.

Cooling line 224 communicates with passage 225 in plunger 210 for cooling thereof.

FIG. 13 shows the fragment of a bucket mold, illustrating one of the two diametrically opposed handle pivot-forming members in the initial molding stage, in which the plastic has been allowed to flow into the mold chambers 206 and is in the process of cooling.

Figure 14:
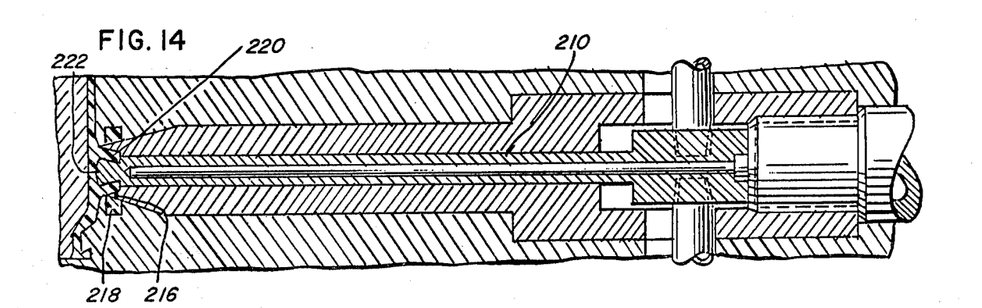
FIGS. 14, 15 and 16 are similar fragmentary longitudinal sectional views of the structure of FIG. 13 in sequential stages of the mold operation.

Thereafter, as illustrated in FIG. 14, plunger 210, by the pressure of plastic against end 222, is moved rearwardly as bulbous end 222 withdraws slightly. One effect of this is to assure the complete filling of inner chamber 220, since the bulbous end 222 provides a outward surge of pressure as it withdraws through inner chamber 220. Plastic material is also, by the same action, forced through gate 126 to assure the complete filling of outer chamber 218.

Figure 15:
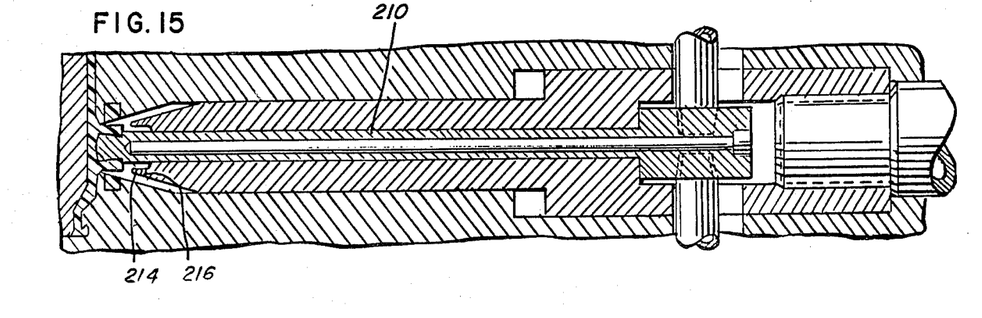

Upon further cooling of the molding material, ring member 214 is then withdrawn, as illustrated in FIG. 15, a residue of plastic being retained in gate 216 until it is pushed out and melted in the next molding cycle.

Figure 16:
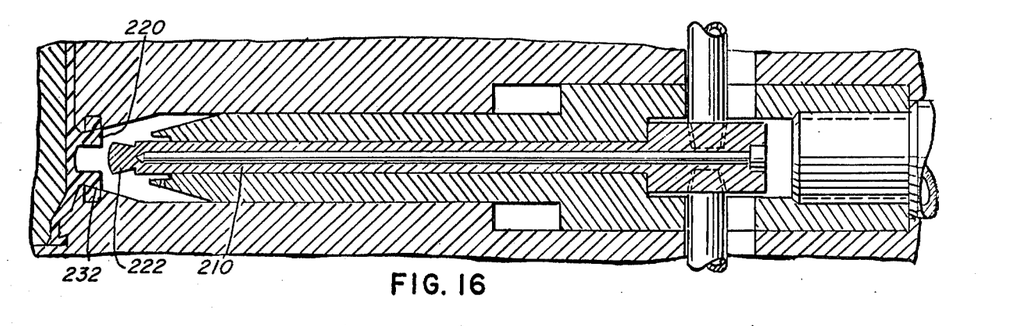

Thereafter, while the molded material in chambers 218, 220 still exhibits some plasticity, plunger 210 is also withdrawn, as shown in FIG. 16. The effect of this is to force the walls of the plastic in inner chamber 220 outwardly because of the bulbous shape of the plunger end 222, which causes the plastic in the inner chamber to bear against the plastic in the outer chamber 218 in a retaining configuration, to generate the pivot of the bucket handle, and to prevent, upon final cooling of the plastic, the outer pivot 221 (FIG. 12) formed in the outer chamber 218, from disengaging from the bucket. The outer pivot 221, shaped in outer chamber 218, rests against the inner pivot or bushing 223, formed in inner chamber 220, along outwardly angled annular surface 232, which is stretched into the outwardly angled configuration shown in FIGS. 12 and 16 by the withdrawing of bulbous end 222 through the bushing 223, to form the completed bucket handle pivot. The handle 225 itself is, of course, attached to the outer pivot 221 formed in chambers 218, having been formed in a handle-forming cavity defined between mold parts 200, 202, and 204.

Referring to FIGS. 17 through 20, another embodiment of the pivot mold system of this invention is disclosed. The drawings illustrate a fragment of a mold, showing the formation of a pivoting member, and may be used in the molding of a bucket and pivoting handle as in the previous embodiment.

Figure 21:
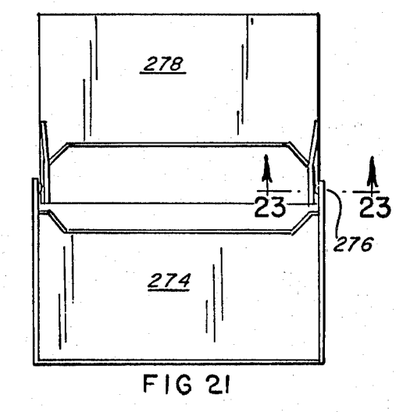
FIG. 21 is a plan view of a box with an integrally attached pivotal lid made in accordance with this invention.
Figure 22:
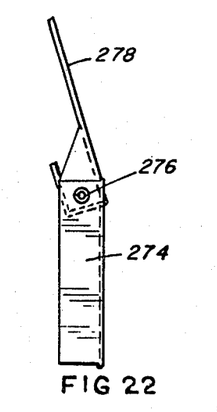
FIG. 22 is an elevational view of the same box and pivotally attached lid.
Figure 23:
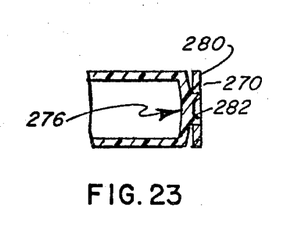
FIG. 23 is a sectional view taken along line 23—23 of FIG. 21.

Also, other structures may be manufactured by the present or previous mold embodiments. For example, an integrally molded box and pivoted lid as shown in FIGS. 21 through 23 may be made in accordance with this invention, by appropriate modification of any of the embodiments disclosed herein. Other integrally molded, pivotally arranged structures may also be made in accordance with this invention as well.

The mold system of FIGS. 17 through 20 utilizes similar principles to those of the previous embodiments, except as otherwise specified. For example, portions of an openable and closable mold system comprising pieces 250, 252 and 254 are disclosed to be of a structure which may be similar to that of the previous embodiment, to define a mold chamber 256 containing molded plastic in the shape of a bucket, a box, or otherwise as desired. The same sort of pivot structure is utilized with the mold, including an insert member 258 which terminates in a ring member 260, similar to the previous embodiments. A plunger member 262 is used which operates for independent axial movement in the general manner previously described.

Ring member 260 defines a pair of spaced mold chambers: an outer chamber 264, which is annular in shape and is connected to a mold chamber for forming the bucket handle, or, alternatively, a mold chamber for forming the lid of the box, not visible in FIGS. 17 through 20, but generally extending behind the parts shown, transversely of the plane of the section of the drawings.

Figure 17:
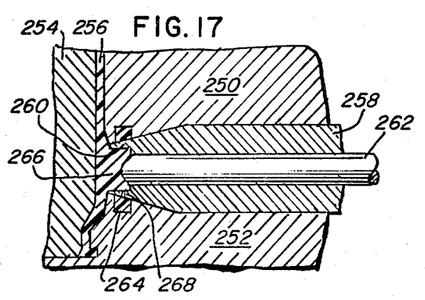
FIG. 17 is a fragmentary longitudinal section al view of a mold for making a bucket or the like, utilizing yet other embodiment for structure for forming the attached, freely pivotable handle.

Inner chamber 266 is, in this embodiment, initially not annular as in the previous embodiments. Gate 268 may, once again, be provided in ring member 260 to facilitate the flow from the inner chamber 266 to the outer, annular chamber 264.

Figure 18:
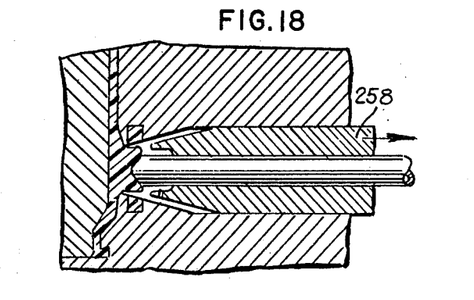
FIGS. 18, 19 and 20 are sectional views similar to that of FIG. 17, showing further sequential steps in the mold operation.

In the operation of this embodiment, the initial molding takes place in the configuration of FIG. 17. Thereafter, upon partial cooling of the mold material, insert 258 is withdrawn, as shown in FIG. 18. Thereafter, plunger 262 is advanced, as shown in FIG. 19, to force the mold material in inner chamber 266 radially outwardly against the plastic material in outer chamber 264.

Figure 19:
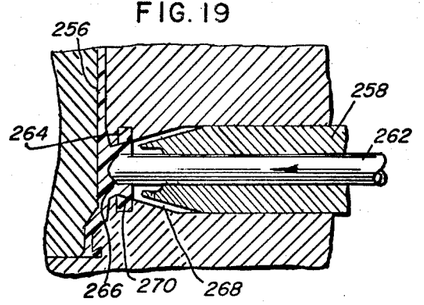

The mold wall 268 is outwardly flared as illustrated, so the junction line 270 between plastic molded in the inner and outer chamber 264 and 266 correspondingly assumes an outwardly flared shape, as illustrated in FIG. 19.

Figure 20:
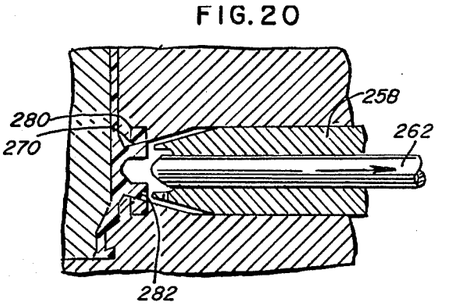

Upon further cooling of the mold material, plunger 262 is then withdrawn, to release the pivot assembly of outer annular member 280 formed in chamber 264, retained by outwardly flared edge 270 on the plastic bushing 282 formed in inner chamber 266, which has been reformed in shape by the advance of plunger 262. Accordingly, the outer member 280 cannot be removed from bushing 282 because of the outward spread of annular surface 270. Accordingly, the pivoting hinge is sturdy and stable, and may be used in molded materials for any of a large multiplicity of purposes.

FIGS. 21 through 23 illustrate a box having a hinged lid which may be made in a mold according to any of the previous embodiments and, specifically, for exemplary purposes, an embodiment of FIGS. 17 through 20. The body 274 of the box, as shown is formed in the main cavity 256 of the mold. Pivot member 276 is illustrated in its as-formed configuration. Lid 278 may be formed by a chamber in the mold communicating with the opposed pair of mold chambers 264.

The above has been offered for illustrative purposes only, and is not to limit the invention of this application, which is as defined in the claims below.

That which is claimed is:

1. A method of forming a pivot assembly comprising the steps of:

providing a first passage, moving a first ring in one direction within said passage to define a first bearing cavity having a first bearing surface formed by the outer surface of said ring and a second bearing cavity having a second bearing surface formed by the inner surface of said ring, forming a retaining cavity in communication with said second bearing cavity and spaced axially of said ring in the opposite direction, moving a first core member spaced radially inwardly of said ring in said one direction to form a wall of said retaining cavity spaced radially inwardly of said second bearing surface, introducing a plastic material into each of said cavities by first passing said material into one of said cavities and then passing plastic material from said one cavity through an aperture in said ring into the other of said cavities to form a first bearing in said first bearing cavity, a second bearing in said second bearing cavity, and a resilient member in said retaining cavity secured to said second bearing, moving said core member in said opposite direction to enable said resilient member to flex radially inwardly, moving said ring in said opposite direction, thus severing the plastic in said aperture from said first and second bearings, while first engaging said resilient member with said ring to flex said resilient member radially inwardly from said radial position intercepting said first bearing cavity and then disengaging said ring from said resilient member for enabling said resilient member to intercept axial movement of said first bearing in said opposite direction.

2. In the method claimed in claim 1, the step of providing a second passage aligned with said first passage and spaced from said first passage with a ring in said second passage for forming a first and second bearing in said second passage, a retaining cavity for forming a resilient member in said second passage to a core member in said second passage with said core member and ring in said second passage moved in syncronism with said first core member and first ring respectively in a direction opposite to the direction in which said first ring and first core member are moved.

3. In the method claimed in claim 1 the step of providing a cup shaped mold cavity for forming a cup shaped article having an annular cavity communicating with each passage to form each said second bearing integrally with the annular wall of said article.

4. In the method claimed in claim 3 the step of providing a bail cavity interconnecting each second bearing for integrally interconnecting each second bearing.

5. The method of molding a pivot assembly which comprises:

placing a ring member in a mold chamber to define a pair of spaced mold cavities inside and outside of said ring member;

filling said mold cavities with material to be molded, and positioning said material at said mold cavities to form separate but interlocking relatively pivotable members, whereby said molded, pivotable members are normally prevented from separating from each other, in which one of said spaced mold cavities is filled by passing softened material to be molded into it through aperture means defined in said ring member communicating with the other of said mold cavities, and thereafter removing said ring member from said pair of spaced mold cavities and pivotable members by temporarily deforming said separate, interlocking, relatively pivotable members to allow said ring member to be withdrawn from between them, and thereafter permitting the separate, interlocking, relatively pivotable members to assume again their interlocked configuration.

6. The method of claim 5 in which said ring member is first removed while said molded pivotable members are still soft, and thereafter said material of the relatively pivotable members is moved into interlocking relationship.

7. The method of claim 5 in which a plunger member is positioned within said ring member and spaced therefrom, whereby the mold cavity inside of said ring member is of annular shape, being defined around said plunger.

8. The method of claim 7 in which said relatively pivotable member molded within the ring member is spread outwardly into interlocking relation with the relatively pivotable member molded outside of the ring member by said plunger member.

9. The method of claim 8 in which said plunger member defines a flared end, said spreading outwardly of the relatively pivotable member being accomplished by drawing said flared end through the relatively pivotable member molded within the ring member.

10. The method of claim 8 in which said pivot assembly is made as part of a handle assembly for a bucket.

11. The method of claim 8 in which said pivot assembly is made as a hinge assembly for a box having an attached lid.

12. A method of forming a pivot assembly comprising the steps of:

placing a ring member in a mold chamber and forming a pair of spaced, molded members in said chamber separated by said ring member and respectively defining first and second bearing surfaces, said spaced molded members integrally connecting with each other through an aperture in said ring member; forming resilient means secured to one of said molded members and integral with one of said surfaces, said resilient means extending radially of said one surface to a position radially intercepting the plane of the other of said surfaces to restrict axial movement of said other surface, said resilient means being capable of retraction by deformation from said position intercepting the plane of said other surface, and moving said ring member axially in one direction to sever the integral connection of said molded members through said aperture and to force said resilient means to retract from said position intercepting the plane of said other surface, and continuing to move said ring in said one direction to disengage the ring from said resilient means, enabling said resilient means to again intercept the plane of said other surface.

13. In the method claimed in claim 12 the step of integrally forming said one bearing surface and said resilient means of plastic.

14. In the method claimed in claim 12 the step of enabling retraction of said resilient means by withdrawing a core member spaced radially inwardly of said ring and extending axially through said ring member.

15. In the method claimed in claim 12, the step of forming said resilient means in three equally spaced ears formed at a position spaced axially from said ring member.

16. In the method claimed in claim 15, the step of forming each ear in an equal arc of said one bearing surface and providing an axial surface on each ear extending from said position intercepting said other bearing surface to said first bearing surface and toward said ring member.

17. The method of molding a pivot assembly which comprises:

placing a ring member in a mold chamber to define a pair of spaced mold cavities inside and outside of said ring member;

filling said mold cavities with material to be molded, and positioning said material in said mold cavities to form resilient, interlocking means whereby said molded, pivotable mebers are normally prevented from separating from each other, and removing said ring member from between said pair of spaced mold cavities and pivotable members by temporarily deforming said interlocking means to allow the ring member to pass from between said molded pivotable members and thereafter permitting said interlocking resilient means to spring back into their interlocking position.

* * * * *